Feb. 19, 1957  T. L. HALLENBECK ET AL  2,781,546
MOLDING MACHINE FOR RESINOUS MATERIALS
Filed Nov. 15, 1951  4 Sheets-Sheet 1

Inventors:
THOMAS L. HALLENBECK,
LAWRENCE D. NINNEMAN.
By Harry O. Ernsberger
Attorney

FIG-9

United States Patent Office 2,781,546
Patented Feb. 19, 1957

2,781,546

MOLDING MACHINE FOR RESINOUS MATERIALS

Thomas L. Hallenbeck and Lawrence D. Ninneman, Toledo, Ohio, assignors to Baker Brothers, Inc., Toledo, Ohio, a corporation of Ohio Application November 15, 1951, Serial No. 256,441

4 Claims. (Cl. 18—30)

This invention relates to apparatus for molding articles from resinous plastic materials and more especially to an arrangement for measuring and feeding the raw material in comminuted form from a supply receptacle to the molds or dies utilized in carrying out molding operations.

In the molding or formation of articles from moldable resins or plastic materials, the raw material or resin used is in comminuted or granulated form. In feeding the comminuted raw material to the molding dies, it is imperative that the material be accurately measured to assure the correct amount for each mold. Difficulties have been encountered in providing a satisfactory material metering or measuring means which will permit the operation of the molding machine at high speeds and simultaneously form a large number of molded articles in a minimum of time in order to obtain commercially practicable operation.

The present invention embraces the provision of apparatus including a combined material measuring and transferring means wherein an accurate measure or quantity of comminuted material may be quickly and automatically made and segregated and transferred to a position or station for rapid conveyance into the die or molding means.

Another object of the invention resides in the provision of a combined measuring and transferring device for use with raw materials supplied to molding machines in which a plurality of measured quantities may be simultaneously determined and wherein each measuring device or unit is rendered independently adjustable to vary the quantity of raw material supplied or transferred by each measuring unit to its respective mold whereby several articles may be formed and cured simultaneously.

Another object of the invention resides in the provision of a material measuring and conveying apparatus for plastic molding machines wherein the material measuring means and the means for conveying the material into the molds is operated in synchronism with the movements of the molding machine ram in a manner in which a high rate of production is attained.

Another object of the invention is the provision of a plurality of relatively movable material conveying chutes arranged to receive and convey the raw material from the measuring device into the mold in combination with actuating means therefor correlated with movement of the ram of the machine whereby the chute is moved out of the locus of the ram during a molding and curing operation of the machine.

A further object of the invention resides in the provision of electrically controlled, fluid actuated means for rapidly moving the material measuring and transferring means from a material receiving station to a material discharging station.

Another object of the invention resides in the provision of a plurality of movable material conveying chutes or tubes for directing molding material into a plurality of molds or dies wherein said chutes are arranged for simultaneous movement by a single fluid actuated means.

A further object is the provision of a plurality of material conveying tubes mounted upon a relatively movable member in a manner whereby each tube may be independently adjusted relative to the movable member to direct the material to a desired point of discharge.

Still another object is the provision of a plurality of material measuring and transferring devices arranged for simultaneous operation and wherein each measuring device may be adjusted from one station.

Still a further object is the provision of a material measuring device for a molding apparatus or press wherein the device is inclusive of a pair of adjustable walls or abutments, each wall or abutment being individually adjustable at a readily accessible position exteriorly of the apparatus.

Another object of the invention is the provision of a reciprocable material measuring device for a molding apparatus or press controlled by means effective to cause the device to measure and deliver a single unit of material to a molding die or successive units of material to the die at each molding operation of the apparatus.

Another object is the provision of a hydraulic actuator for a molding press and control means therefor adapted to facilitate a limited and temporary retractive movement of the actuator to provide for the escape of gas from the molding die when the press is utilized for molding operations involving resins of a character giving off gases during molding thereof.

Another object is the provision of a hydraulically operated ram or piston reciprocable in a cylinder for operating a relatively movable die wherein fluid metering means are effective as the piston approaches its limits of movement to retard or cushion the same to eliminate shock of stopping the rapidly moving piston.

Another object is the provision of means for ejecting completed or molded articles from a die or mold and entraining them in a moving air stream for conveying them away from the molding zone and directing a second air stream or air blast into the mold to clean the same preparatory to the successive molding operation.

Another object is the provision of molding apparatus incorporating fluid actuated means for operating the molding material measuring units and the means for moving the material delivering tubes into effective position for discharging material into the relatively stationary die and for withdrawing the tubes to an out-of-use position away from the path of the movable die during downward movement thereof, the fluid actuated means being controlled by electrically energized means correlated to obtain high speed operation of the apparatus.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

While a form of the invention is illustrated which may be preferred for measuring, transferring and feeding or discharging resinous raw materials to a plurality of molds or dies and molding the materials to predetermined shapes, it is to be understood that the principles of the invention may be incorporated with any apparatus where the same may be found to have utility.

Figure 1:
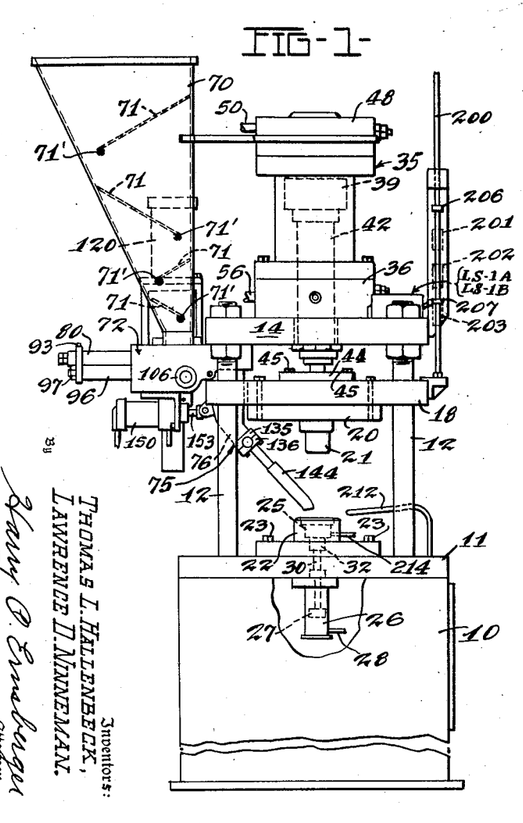
Figure 1 is a front elevational view of a molding machine or apparatus embodying the invention for molding resinous or plastic materials into articles of predetermined configuration.
Figures 2, 3:
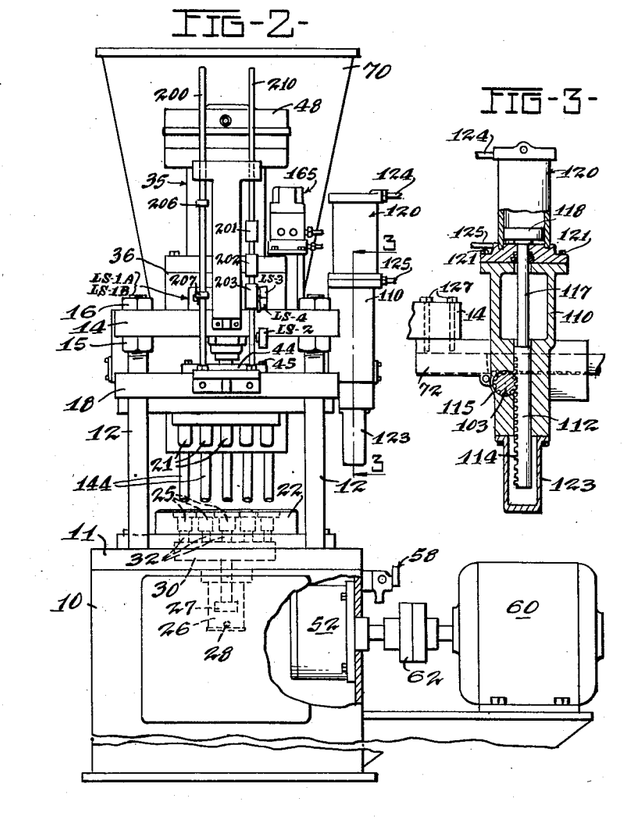
Figure 2 is a side elevational view of the apparatus shown in Figure 1.
Figure 3 is a detail sectional view taken substantially on the line 3—3 of Figure 2.

Referring to the drawings in detail, and initially to Figures 1 and 2, the apparatus, machine or molding press is of the type which is preferably fluid operated, the valves and actuating devices therefor and sequence timing devices being electrically operated and controlled. The machine is inclusive of a base or frame 10 upon which is mounted a bolster or mold supporting plate 11. Extending upwardly from the bolster plate 11 is a plurality of upright struts or rods 12 which support a head or relatively stationary plate 14. The rods 12 are threaded at their upper portions to receive threaded nuts 15 and 16 through the manipulation of which the plate 14 may be vertically adjusted and secured to the rods 12. Reciprocably mounted upon the rods 12 is a reciprocable platen or ram 18, the rods forming ways to guide the platen 18 in its vertical reciprocatory movements. The platen 18 carries a plate 20 secured to the platen by means of suitable bolts. The plate 20 carries the male portions 21 of the molding dies. Mounted upon the bolster plate 11 is a die member 22 secured to the bolster 11 by means of bolts 23. The member 22 is configurated to include the female portions or cavities 25 of the molding units, and in the embodiment illustrated there are five molds or female portions 25 for concomitantly forming five molded articles at one operation. It has been found practicable to employ dies and associated elements and mechanisms for simultaneously molding eight articles at each molding cycle and more may be formed at one time by providing the requisite number of molds and material measuring and delivering units.

Disposed beneath the bolster 11 is a comparatively small cylinder 26 within which is reciprocably mounted a piston 27 adapted to be actuated by fluid means such as compressed air conducted to the cylinder through a tube 28. The piston 27 is connected with a bar 30 provided with a series of article ejector pins 32 for elevating or ejecting molded articles from the female die portions 25 after such articles have been molded or formed. The admission of air under pressure to the cylinder 26 through the tube 28 is controlled by a suitable valve (not shown) actuated or controlled by electrical means set into operation by mechanism dependent upon the relative position of the platen 18 in a manner to be hereinafter explained.

Figures 6, 7, 8:
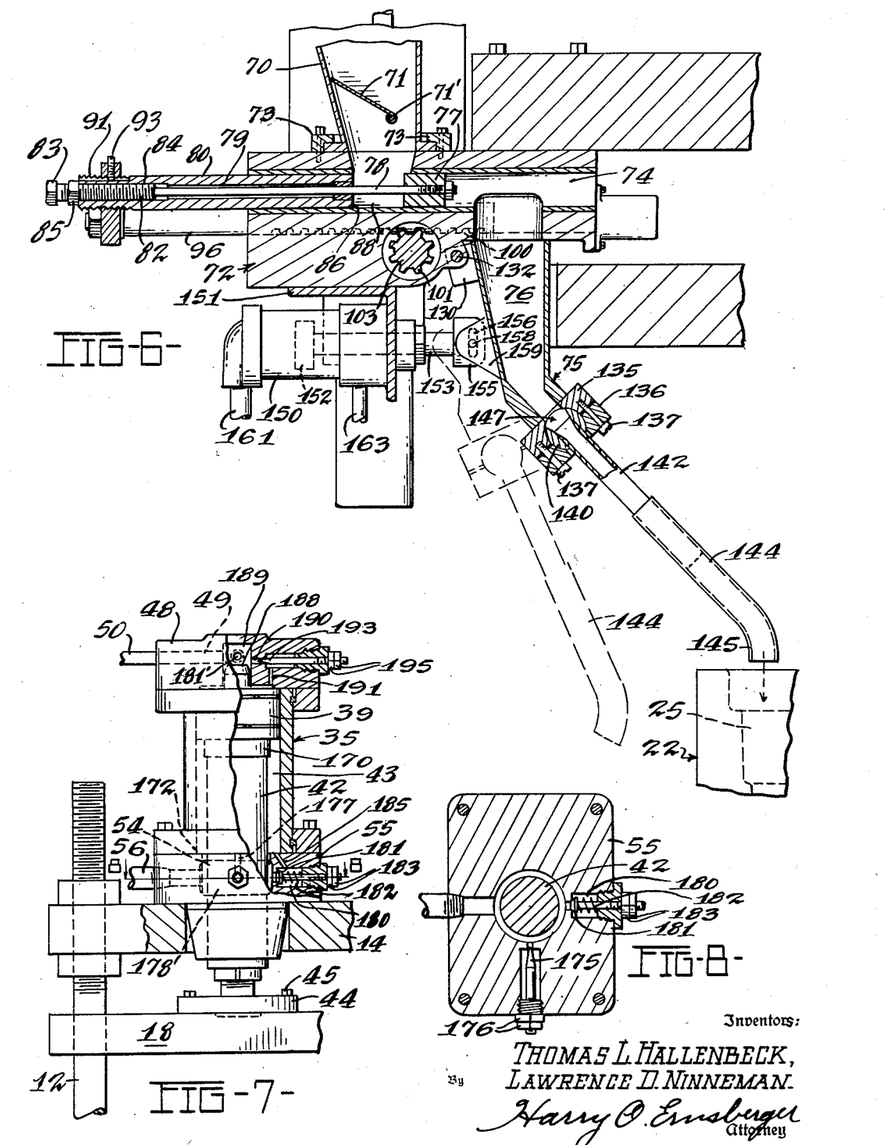
Figure 6 is a vertical sectional view through the material measuring, transferring and discharging means of the invention.
Figure 7 is an elevational view partly in section illustrating the ram actuating means of the apparatus.
Figure 8 is a horizontal sectional view taken substantially on the line 8—8 of Figure 7.

Mounted upon the upper surface of the frame plate 14 is a hydraulic actuator including a cylinder 35 formed with an enlarged base member 36. Reciprocably mounted within the cylinder is a piston member 39 which is carried at the upper end of a piston rod 42, the rod 42 being secured to a fitting 44 secured to the platen 18 by means of bolts 45, as shown in Figure 7. The cylinder 35 is provided with a head portion 48 within which is formed a duct 49 in communication with a feed pipe or tube 50 adapted to convey pressure fluid to the upper end of the cylinder from a hydraulic pump 52. The pump 52 is of the so-called duplex type adapted to deliver a comparatively large volume of oil or pressure fluid at a low pressure or a small volume at high pressure, the action being automatically controlled by the resistance encountered in operating the hydraulic actuator.

The base portion 36 of the cylinder is formed interiorly with a chamber 54 to which pressure fluid is conveyed from the pump 52 through a tube 56 during a retractive movement of the piston 39. Intercalated with the hydraulic feed circuits including tubes 50 and 56 and hydraulic pump 52 is a 4-way valve 58 of conventional character for alternately directing pressure to one or the other of the tubes 50 and 56 to elevate or lower the piston 39, platen 18 and die 21 and to alternately connect the tubes to exhaust liquid from the cylinder into an oil reservoir or supply (not shown) contained in the base of the frame and connected with the pump 52. The hydraulic pump is adapted to be driven by an electrically energizable motor 60 through a suitable drive coupling 62. A more detailed description of the hydraulic arrangement and operation and control of the movements of the piston 39 will hereinafter appear.

The present invention is inclusive of means or apparatus for measuring, transferring and delivering raw or uncured plastic or resinous material in powdered or comminuted form to the molds in the die 22. This arrangement is inclusive of a hopper 70 which is adapted to contain a supply of the uncured moldable material. In order to prevent the raw material from caking or bridging in the hopper, there is provided a series of baffles 71 disposed in the positions shown in Figure 1. The baffles serve to distribute the material weight and avoid concentration of weight at the metering zone. The baffles 71 are preferably pivotally supported as at 71' to facilitate cleaning the hopper. The hopper is held in place by L-shaped clamps 73 facilitating slidable removal or replacement of the hopper. Disposed beneath the lower extremity or outlet of the hopper 70 is a member or block 72 preferably of rectangular configuration formed with a plurality of parallel bores or chambers 74 adapted to contain material measuring devices or units for periodically receiving predetermined amounts of raw material from the hopper 70 and transferring the measured amounts or charges to a delivery means adapted to convey the material to the molds or cavities 25.

Figure 4:
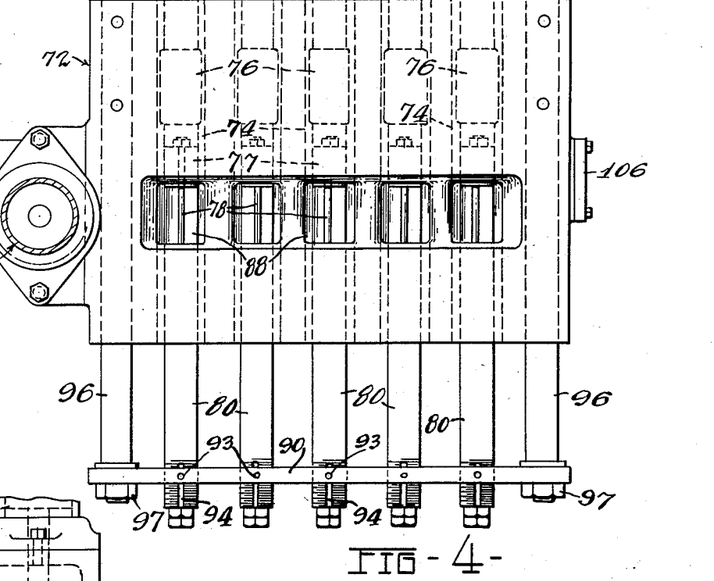
Figure 4 is a top plan view of the raw material measuring and transferring means forming part of the invention.
Figure 5:
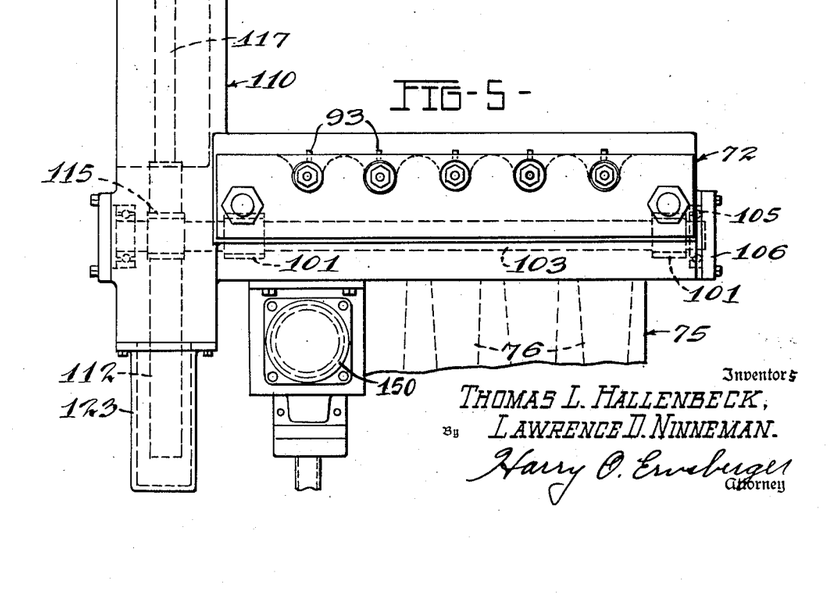
Figure 5 is an elevational view of the arrangement shown in Figure 4.

In the present embodiment, the block 72 contains five material metering chambers as illustrated in Figures 4 and 5 but any number of chambers may be formed in the block corresponding to the number of individual molds 25, and in practice it has been found practicable to employ eight or more chambers and a corresponding number of molds in the die block 22. Associated with each of the chambers is a material discharge means including a member 75 formed with individual chutes or compartments 76 for directing the material away from the material measuring and transferring means.

Reciprocably or slidably disposed in each of the chambers 74 is a plunger or abutment 77 mounted upon a rod 78 which is contained in an interior bore 79 of a sleeve or member 80. Both the abutment 77 and sleeve 80 are of diameters to be snugly yet slidably received in a chamber 74. The rod 78 is formed adjacent one end with an enlarged threaded portion 82 terminating in a polygonal head 83. The threaded portion 82 cooperates with a threaded portion 84 of the bore 79 whereby individual rotation of the rod 78 through the use of a suitable tool applied to the head 83 provides an adjustment of the plunger or abutment member 77 relative to the inner face 86 of the sleeve 80 forming a measuring compartment 88 between the abutment and the wall 86 for metering or measuring the amount of material constituting a charge adapted to be transferred and delivered into a mold in the block 22 at each successive movement of the actuating mechanism with which the plunger 77 and sleeve 80 are associated. Each sleeve 80 and its adjacent abutment 77 may be locked in relative position by drawing up the lock nut 85 into frictional contact with the end of the sleeve.

Means is provided for connecting all of the measuring devices in a manner whereby they may be simultaneously operated to perform material measuring and transferring operations and for adjusting the sleeves 80 to properly synchronize or orient the position of each measuring chamber with the topper outlet. One form of such connecting means includes a bar or member 90 formed with threaded bores, each adapted to receive and accommodate the threaded portion 91 of the sleeves 80, set screws 93 being employed for securing the sleeves 80 in a particular position of adjustment with respect to the bar 90. The extremities of the sleeves 80 are preferably formed with keyways or kerfs 94 to receive the extremities of the locking screws 93. Thus by backing off a locking screw 93, each sleeve 80 and associated mechanism may be initially adjusted longitudinally in its respective chamber 74.

Actuating means for reciprocating the material metering or measuring and transferring devices includes the shafts or rods 96 connected to the bar 90 secured thereto by means of nuts 97 as shown in Figure 4. The rods 96 are slidably fitted into bores in the block 72 and also serve as guide means for reciprocable movements of the measuring device assemblies. As shown in Figure 6, a surface portion of each rod 96 is formed with a series of teeth or dental projections 100 adapted to mesh with teeth of a pinion 101 whereby rotation of the pinion 101 effects longitudinal movement of the material measuring devices. The pinion 101 may be mounted upon or integrally formed as a part of a shaft 103 extending through a suitable bore formed in the block 72. One end of the shaft 103 is journalled in suitable antifriction bearings 105 housed within a closure 106 secured to the block 72.

Secured to one edge wall of the block is a vertically disposed member 110 which is of hollow construction to accommodate a shaft 112 formed with a toothed rack portion 114 in mesh with a pinion or gear portion 115 formed on the shaft 103 as shown in Figure 3. The member 112 is formed with a rod-like extension 117 which is connected at its upper end to a piston 118 disposed for reciprocable movement in a cylinder 120 mounted upon the upper end of member 110 by means of bolts 121. The lower extremity of member 112 is enclosed within a shield or cup member 123 secured to the member 110.

The upper and lower end constructions of the cylinder 120 are provided respectively with tubes or ducts 124 and 125 for selectively directing compressed air or other pressure fluid into the cylinder 120 for actuating the piston 118, rack member 112, pinion gear 115 and shaft 103 to reciprocate the material measuring and transferring mechanism. The block 72, hopper 70 and member 110 are preferably supported from frame member 14 by means of bolts 127 extending through openings in the frame member 14 and projected into threaded openings formed in block 72. The material measuring units including the sleeves 80 and abutments 77 are simultaneously reciprocated in the chambers 74 through the delivery of fluid under pressure such as compressed air alternately above and below the piston 118 to actuate the rack 112 and gear portion 115, rotating shaft 103 whereby pinions 101 drive the rods 96 to impart material transferring movement to the material measuring means.

A wall portion of member 75, formed with the material chutes or conveying ducts 76, is provided with a projection 130 articulately or pivotally secured to the block 72 by means of a stub shaft 132 as shown in Figure 6. Such pivotal mounting of the member 75 provides for directing the powdered material into the molds 25 in the die block 22 at the proper period in the cycle of operations and permits the swinging of the chute structure out of the path of the platen 18 when the latter is moved downwardly carrying the mold or die 21 into the material in the molds 25 to fashion the material in the shapes provided by the molds.

It is desirable that each material guiding chamber or chute 76 be in registration with an articulately mounted discharge tube so as to assure efficient and rapid delivery of the material into the molds 25. Furthermore in certain molding operations, molds of different sizes are incorporated in the block 22 and hence the adjustment of the delivery tubes must be effected to assure proper disposition of the raw material.

As particularly shown in Figure 6, the member 75 may be provided adjacent the extremity of each of the chutes 76 with an enlarged boss portion or block 135 with which is mated a cap member 136 secured to the block by means of screws 137. The block 135 and cap members 136 are formed with semispherical recesses in registration forming spherical recesses to accommodate ball-shaped members 140. Secured in a bore in each ball-shaped member 140 is a tube 142 with which is frictionally telescoped a material discharge or delivery tube 144 having a spout portion 145 for directing the molding material into the mold 25.

The arrangement of the ball-shaped member 140 contained within the block 135 and cap member 136 provides a swivel joint for individually adjusting the angularity of the pairs of tubes 142 and 144 with respect to the chute member 76. The opening 147 in each of the ball-shaped members 140 is of frusto-conical shape to accommodate the relative angular adjustments of the delivery tubes so as to facilitate flow of the measured charges of material from the chambers in member 75 into the discharge tubes. The block 135 and the cap member 136 of each material discharge assembly are fashioned with sufficient space therebetween so that the screws 137 when drawn up serve to frictionally secure the ball-shaped members 140 in position and determine the angular adjustment of the material discharge unit. Each of the chambers or chutes 76 is provided with an adjustable material delivery unit of the character above described and each is individually adjustable so as to accommodate delivery of material into molds of different sizes and shapes.

The apparatus embodies power actuated means for swinging the member 75 and material delivery units from a material-discharging position to an out-of-use position, the latter being out of the path of movement of the platen. As illustrated in Figure 6, a cylinder 150 mounted upon a frame member 151 encloses a reciprocable piston 152 carried by a rod 153. The rod is provided with an enlarged terminus 155 having a slot 156 formed therein adapted to accommodate a pin 158 carried by boss portions 159 integrally formed on the member 75. The piston 152 is actuated by fluid pressure, as for example, compressed air conveyed by tube 161 into the cylinder 150 at the lefthand end of the piston as viewed in Figure 6 to move the piston in a righthand direction and dispose the material delivery tubes 144 over the mold configurations 25 in the die block 22. A tube 163 is arranged to convey pressure fluid to the opposite end of the cylinder to move the piston 152 in a lefthand direction whereby the delivery tubes 144 are swung to an out-of-use position as indicated in dotted lines in Figure 6. The delivery tubes are maintained in such out-of-use position at all times except when the charges of raw material are being conveyed into the molds 25. The flow of compressed air to the cylinder 150 is controlled by valve mechanism contained within a housing 165 disposed adjacent the cylinder 35 and supported upon the plate 14 as shown in Figure 2.

The material metering or measuring means is preferably fluid actuated by the delivery of fluid under pressure to the cylinder 120 through tubes 124 and 125 illustrated in Figure 3. The tubes 124 and 125 are controlled by the valve mechanism contained in the valve housing 165, the valves being actuated and controlled by electrical means. While any suitable pressure fluid may be utilized for actuating the material metering means and the relatively movable material delivery tubes, it has been found that compressed air provides a satisfactory medium for the purpose. It is to be understood that other motivating means may be utilized if desired.

The cylinder 35 within which is disposed the piston 39 for actuating the platen 18 and the male die 21 carried thereby is arranged to be actuated in a manner providing for a degassing or breathe cycle during a molding operation when the apparatus is utilized for molding certain resins. The piston 39 is arranged for primary movement to its lowermost or die closing position under the influence of fluid pressure and is then momentarily elevated a short distance to provide for the escape of gases from the compressed material in the molds. After a short interval of time, the piston is returned to its lowermost position to again bring the male die 21 into complete engagement with the material in the molds 25, the elements remaining in such position during a heating of the molds to cure or set the material. A so-called degassing cycle is described with certain resins such as urea resins and phenolic resins. In order to accomplish this function the piston rod 42 is provided with a portion 170 which upon downward movement of the piston 39 enters a bore 172 formed in a base portion 55. When this occurs, the pressure above the piston through the introduction of oil or other fluid into the tube 50 cannot move the piston 39 further downwardly because the exhaust of oil or other fluid beneath the piston cannot flow through the bore 172 as it is substantially closed by the tenon or shoulder 170. A metering valve in the form of a tapered needle 175 which is adjustable by manipulation of nuts 176 cooperates with a bypass chamber 177 to facilitate the flow of a restricted amount of fluid through the bypass into the chamber 178 beneath the piston 39 in the base member 55, and in this manner the desired rate of die closing movement of the piston may be retarded and controlled.

A valve means is provided for establishing a flow of pressure fluid beneath the piston 39 to elevate the latter on a so-called breathe cycle. To accomplish this purpose, the base member is formed with a bore 180 within which is slidably disposed a valve 181 which is urged or biased towards closed position by means of a spring 182. The relative position of the valve 181 may be adjusted by manipulation of adjusting nuts 183. The bore 180 is in communication with the interior of cylinder 35 by means of a bypass 185 formed in the base member 55.

By impressing fluid pressure through tube 56 for a short interval of time in a manner hereinafter explained, the check valve 181 is opened and the pressure fluid becomes effective upon the full area of the piston to elevate the latter a limited distance. Fluid pressure then applied through tube 50 above the piston returns the piston to its lowermost position during the heat curing period of the material in the molds.

In molding resins of the alkyd type which do not require a degassing period, the nuts 183 may be manipulated to permanently unseat the valve 181 and the metering bypass 177 is thereby rendered substantially ineffective as offering resistance to downward movement of the piston. It should be noted that the piston rod 42 is of substantial diameter so that the space 43 between the cylinder and piston rod walls is of low volume so that a minimum amount of oil or other pressure fluid is required to elevate the piston to its initial position and in this manner secure a rapid return movement of the piston.

A check valve 181' shown in Figure 7 is provided in the cylinder head 48 of substantially the same construction as the check valve 181 disposed in the base of the cylinder. The chamber associated with the check valve 181' is in communication with the cylinder through a bypass (not shown) so that full fluid pressure may be exerted upon the upper surface of the piston 39 on the down stroke even though the tenon 188 projects into the bore 189.

Pressure fluid directed through the tube 50 formed in the head portion 48 of the cylinder 35 is effective upon the portion 188 of reduced diameter extending into a bore 189 formed in member 48. While portion 188 is projected into the bore 189, the full area of the piston is subjected to pressure of fluid through the bypass associated with the chamber containing the check valve 181' and through a restricted bypass formed by passages 190 and 191. The piston is subjected to high volume flow of oil or fluid when portion 188 opens through bore 189 after which the piston is moved down rapidly. The rate of flow of fluid through the bypass formed by passages 190 and 191 between the chamber 189 and the interior of the cylinder is regulated by a tapered needle-like valve 193, the position of which may be adjusted by regulating the relative positions of the nuts 195.

Figure 9:
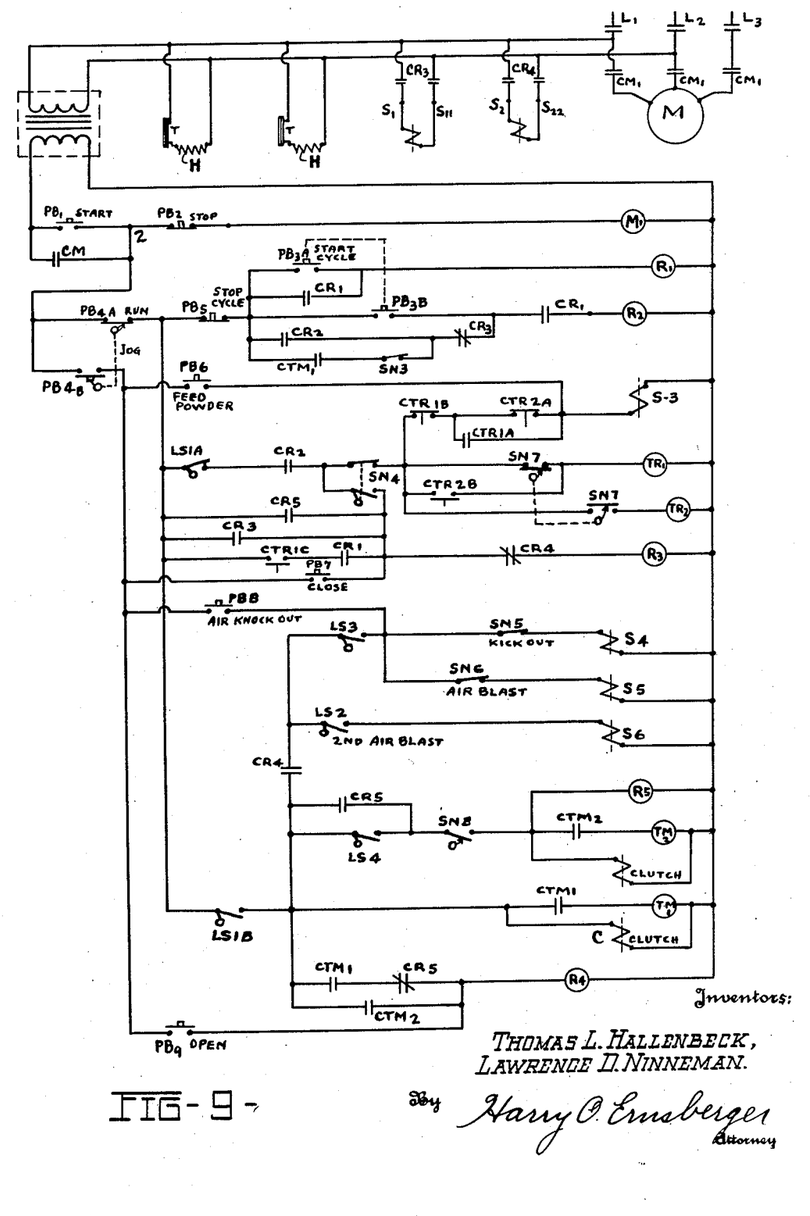
Figure 9 is a diagrammatic view illustrating the electrical circuits and control mechanisms and units for the molding apparatus or press.

Figure 9 is a diagrammatic illustration of the electrical circuits and electrically actuated or controlled units for controlling, actuating and establishing the proper sequence of operation of the several units or mechanisms of the machine. The following explanation of the circuit operation intercalated with a description of the operation of the machine elements hereinbefore described will serve to clearly exemplify the cycling of the machine in carrying out molding operations.

It is to be understood that the machine or apparatus of the invention is adaptable for various kinds of plastic molding under a wider range of molding pressures utilizing various types of raw comminuted resinous material certain of which such as the urea resins and the phenolic resins require a degassing or breathe cycle to provide efficient molding. The apparatus furthermore embodies a control and actuating means for delivering single measured quantities to the molds 25 or successively delivering two measured quantities or charges into the same mold before the piston 39 and elements associated therewith are moved downwardly to mold and set the plastic material. In the following explanation, the phrase "single shot" is illustrative of the delivery of a single metered amount of material into a mold while the phrase "double shot" is indicative of successive deliveries of metered amounts of material to the same mold before a molding operation is initiated.

With particular reference in detail to the circuit diagram of Figure 9, electrical energy is supplied by conductors L1, L2 and L3 connected with a source of electrical energy. The motor M is energized to drive the hydraulic pump 52 for supplying oil or other fluid under pressure for actuating the piston or ram 39 of the machine. The characters PB1 and PB2 are indicative of conventional push button switch controls to manually establish and disestablish a circuit to the motor M1 and also energize the terminal 2 of the cycle control circuit.

Assuming that the piston or ram is at its uppermost or initial position and it is desired to initiate a cycle of operations, this may be accomplished by manipulating the switch PB3A and switch PB3B to establish a circuit for energizing the relays R1 and R2. Both of the relays R1 and R2 are self-holding through the medium units CR1 and CR2 which are bridged across the switches PB3A and PB3B respectively.

It should be noted that the cam operated limit switch LS1A (which is disposed adjacent the control rod 200 at the front of the machine as shown in Figure 2) is in closed position when the press ram or piston is in its uppermost or die-open position. With the elements in this position, the control circuit is established through the limit switch LS1A and the relay CR2 (which was closed by the relay R2) to the switch SN4, which is the material measuring and feeder cutout switch and is illustrated in the circuit with the feeder mechanism. The limit switch arrangement LS1A and LS1B is in the form of a single pole, double throw maintained contact switch which is adapted to be actuated by cams or collars 205 and 207 on the control rod 200 supported upon the movable platen 18 as shown in Figures 1 and 2. If the feeder cutout switch SN4 is in the off position, the piston 39 and platen 18 will go through and complete an automatic cycle without actuating the material metering or measuring apparatus and without swinging the material delivery tubes 144 into a position above the molds 25 for delivering the resin powder into the molds.

The circuit includes a switch mechanism designated SN7 which is the control for initiating the injection of either a single or a double metered charge of molding material, that is, the initiation of a single movement of the material metering and feeding means or a double movement thereof. As shown in the circuit diagram Figure 9, the switch SN7 is illustrated in a position to initiate the metering of a single charge for delivery into the molds with each vertical reciprocation or cycle of the piston 39 and platen 18.

When a single charge of powder or raw material is to be delivered into the forming mold, the coil S3 of solenoid air valve contained within the valve housing 165 is energized and air pressure is directed through tube 161 into the cylinder 150 forcing the piston 152 in a right-hand direction as viewed in Figure 6 so as to move the material delivering tubes 144 from the dotted line position out of use to the position shown in full lines in Figure 6 for conveying the comminuted raw material into the molds 25. The same air pressure operative in cylinder 150 is concomitantly operative upon the piston 118 in cylinder 120 through the tube 125 elevating the piston 118 and causing the rack member 114 to rotate the shaft 103 and move the material measuring bars or units 80 from the position shown in Figure 6, at which the chambers 88 have received a charge of raw material, to a position above the chute construction 76 whereby the charge of material contained in each metering chamber 88 is discharged through the chute 76 and the delivery tubes 144 into the molds.

At the same time the timing relay TR1 is energized. Upon the expiration of a predetermined time period for which the timing relay TR1 may be set, the contact CTR1B is opened and the solenoid S3 thereby deenergized, thus cutting off the air pressure to the cylinders 150 and 120. When the solenoid S3 is deenergized, it operates valve mechanism in housing 165 to direct compressed air through tubes 124 and 163 into cylinders 120 and 150 respectively to retract the material measuring devices 80 to a position again bringing the measuring chambers 88 beneath the hopper 70 and swings the delivery tubes 144 out of the path of the platen to the dotted line position shown in Figure 6. Simultaneously the time delay period of relay TR1 has lapsed, the other contact CTR1C closes, the contact CR1 having been held since relay R1 was initially closed at the start and in this manner relay R3 is energized.

It should be noted that the contacts CR3 energize the solenoid S1—S11 which operates the four-way valve mechanism contained in housing 58 to cause the pinion 39 to be moved downwardly under pressure fluid such as oil conveyed to the upper end of cylinder 35 through the tube 50. When the platen of the press is thus moved to di-closing position, the cam operated limit switch LS1A is thereby opened by the control collar 206 on the control rod 200 which permits the relay TR1 to be automatically reset in preparation for the next cycle.

When the limit switch LS1A is thus opened, it eliminates the effectiveness of relays TR1 and TR2 which are automatically reset in preparation for the next cycle. The limit switch LS1B is closed by collar 206 (see Figure 2) when the platen reaches its lowermost position and energizes timer TM1 and sets into operation the timing mechanism for determining the heating or curing period of the molds 25 during which period the molds are heated by electrical current, the heaters being designated H in Figure 9 and are incorporated in the mold construction in the form of resistance heating units.

The hydraulic pump arrangement 52 is of a duplex character adapted to deliver liquid under pressure at different values. In the present apparatus it has been found that a pressure of approximately two hundred to three hundred pounds per square inch supplied by the pump 52 at a high volume gives a very fast movement to the piston 39 in moving the platen and dies to near closed position. When the dies have closed upon the material, the resistance increases and the pump pressure on the liquid likewise builds up many times the original low pressure from two thousand to three thousand pounds per square inch which compresses the resinous material and holds the male dies 21 in proper molding position in the dies 25 during the heating or curing operation.

The apparatus is provided with control mechanism for maintaining the platen 18 and die 21 in mold forming position for a continuous period of time during which the material is cured by heating. The arrangement is inclusive of control means for a so-called breathe cycle operation which provides for a degassing interval between two molding pressure periods when the apparatus is used for molding materials such as urea resins and phenolic resins and for rendering this mechanism ineffective for molding alkyd resins which do not require a breathe cycle or degassing period. The operation of the apparatus for holding the piston 39 in its lowermost or molding position without including a breathe cycle is as follows: When the limit switch LS1B closes (this action taking place when the platen is at the bottom or lowermost position in its stroke) the snap switch SN8 is in the non-breathe or normal open position as shown, and the timer TM2 is not in the circuit but the timer TM1 is energized. TM1 is a clutch type timer and when electrical clutch C is energized, the unit CTM1 starts the timer motor TM1.

At the expiration of the curing time determined by the period of operation of the timer motor TM1, the control unit CTM1—TC closes which action energizes the relay R4. The unit CR4 then opens and interrupts the circuit through the relay R3 which in turn interrupts the solenoid circuit S1—S11 to release the fluid pressure above the piston 39. Another contact relay CR-4 then energizes the solenoid S2—S22 which operates the hydraulic valve mechanism contained in housing 58 and directs pressure fluid from the hydraulic pump 52 through the tube 56 into the lower end of the cylinder 35 beneath the piston 39, which action elevates the piston and the movable platen 18 to move the male die from mold forming position in the female mold 25. The arrangement for ejection and disposition of the completed molded articles will be hereinafter described.

The arrangement of the invention includes a control circuit for incorporating a breathe cycle to momentarily elevate the piston 39, platen 18, and male die 21 carried thereby for a short distance and for a limited period of time to permit the escape of gases which are formed when articles are molded from certain types of resins. In the operation of the mechanism incorporating a breathe cycle step, the toggle switch SN8 is manually moved to closed position (it being shown in nonbreathe cycle position in Figure 9) to embody the operating units in the circuit for inclusion of the breathe cycle in the molding operation. The timer TM2 will not initially be energized when the platen is moved to molding position because the limit switch LS4 is in open position except for a momentary period during the downward movement of the platen at which time the limit switch LS1B is still in open position.

The timer TM1 however is energized and when the time period for which the timer TM1 is set has expired, relay R4 will be energized and the control units CR4 will be energized operating the solenoid mechanism to direct pressure fluid beneath the piston 39 to initiate an upward or opening movement of the platen and male die 21. As the platen moves upwardly the cam member 202 on the control rod 210 engages limit switch LS4 which completes the circuit energizing the relay R5. The contact CTM1-TC will remain closed so long as the clutch CTM-1 is energized, but the contact CR5 deenergizes the relay R4 and contact CR4 deenergizes the solenoid S2—S22 thereby releasing fluid pressure acting upwardly on the piston 39. Simultaneously another contact CR5 will complete the circuit through the relay R3 again which in turn completes the circuit through the solenoid S1—S11 to direct pressure fluid again through tube 50 and above the piston 39 to return the latter, the platen 18 and the male die 21 to their lowermost positions where they are held during a curing period of the molds. In this manner the piston is moved upwardly a short distance for a momentary period of time just sufficient for the gas to escape from the mold after which the male mold 21 is moved to its lowermost position for the curing operation. The distance that the male die moves away from the female die during the degassing operation may be controlled or regulated by adjustment of the cam 202 carried by the control rod 210 at the front of the machine.

At the time in the cycle of operation that the limit switch LS4 was closed on the upward movement of the platen, the relay R5 was energized together with the clutch TM2, the contact CTM2 starting or initiating the operation of the timer motor TM2 for controlling the period of heating or curing of the formed articles in the molds. While the timer TM2 is in operation, the relay R4 is deenergized because R5 will be in self holding position (by reason of the contact CR5 bypassing the limit switch LS4) and thus the contact CR5 is held in open position. When the time period has expired and timer TM2 is out of circuit, contact CTM2-TC will close thus energizing the relay R4. Contact CR4 then deenergizes relay R3 and contact CR3 releases S1—S11 to release the fluid pressure holding the piston 39 in its lowermost position. Simultaneously the contact CR4 energizes the solenoid S2—S22 operating the hydraulic control valve to direct pressure fluid through the tube 56 beneath the piston 39 to force the latter, the platen and die 21 carried thereby to their uppermost positions, that is, to an open position of the press.

It should be noted that the limit switch LS4 will again be closed during upward movement of the platen but it will be ineffective because the clutch timer TM2 is still energized, the timer operation has expired, but it has not been reset for the succeeding cycle. When the platen reaches its uppermost limit of movement, limit switch LS1B is again opened by the cam or collar 207 which action resets the timers TM1 and TM2 and deenergizes relay R4, limit switch LS1A being closed in preparation for the next molding cycle of the press.

The apparatus is inclusive of air jets 212 for directing blasts of air under pressure across the female die 22 at the same time that air pressure is admitted to the cylinder 26 beneath the piston 27 for ejecting the completed or molded articles from the molds 25. The apparatus also includes a series of tubes 214 for directing blasts of air directly into the molds 25 after the male die 21 has been elevated a substantial distance in its upward movement after the completion of a molding operation. The blasts of air from the jets 212 across the die function to entrain and remove the ejected articles by the air stream and convey them into a receiver or receptacle (not shown) while other blasts of air are directed into the molds 25 through the tubes 214 to remove or blow out any residual powder or unattached particles or flash of plastic which may remain in the molds in order that they may be cleared for subsequent molding operations.

The circuit illustrated in Figure 9 includes control units for operating valves (not shown) for controlling the air blasts and the article ejecting means. The article ejector control circuit includes a limit switch LS3 and the circuit for controlling the second blast of air ejected directly into the molds includes a limit switch LS2, both of which were moved to circuit closing position by the cam 201 mounted upon the control rod 210 when the press or platen was moved to its lowermost position. They are not however effective during the downward movement of the piston 39 or during its hold period because the relay CR4 is in open position. When, however, the piston 39 and the platen 18 move upwardly after the completion of a molding and curing operation, the relay R4 being still energized and contact CR4 held in closed position (limit switch LS1B being closed) the limit switches LS3 and LS2 are then intercalated in the circuit. The limit switch LS3 closed by the cam 201 completes the circuit for actuating the solenoid S-4 for controlling the valve mechanism (not shown) for directing compressed air into the cylinder 26 beneath the piston 27 to elevate or eject the molded articles out of the molds 25. Simultaneously the solenoid S5 is actuated controlling a valve (not shown) to direct compressed air through the jets 212 for directing air blasts across the die 22 to entrain the molded articles in the blast and carry them into a receptacle. The platen 18, continuing its upward movement, causes the cam 202 to close the limit switch LS2, completing a circuit through a solenoid operated air control valve (not shown) which is moved to a position to direct compressed air through the tubes 214 into the molds to remove any unmolded material or flash that may remain in the molds 25 at the completion of the molding cycle.

It is to be noted that the manually operated switches SN5 and SN6 may be individually operated to control the inclusion in the operative cycle of the article ejecting mechanism or the circuit for controlling the article removing air blasts. The operation circuit for the second air blast for cleaning out any remaining material in the molds 25 is not intercalated with the switches SN5 and SN6 and will be effective even though the ejector mechanism and the first air blast are rendered inoperative by the switches SN5 and SN6.

The foregoing description of the operation of the apparatus and the controlling and actuating devices therefor included an explanation of the operation of the material metering or measuring means where a single charge of powder is directed into each mold in a complete operative molding cycle. The control mechanism for the apparatus is inclusive of an arrangement for successively directing two charges of material or a "double shooting" of the material feeding mechanism during a single molding operation. Such an arrangement has particular utility where the molds are large requiring more material than that of a single charge delivered into the mold. Hence, it has been found advantageous in molding certain large articles to utilize two individual measured amounts of material for delivery into a mold at each molding cycle.

In the operation of the control mechanism, one contact of the unit SN7 is closed and the circuit is effective through CTR1B and CTR2A to energize S3, the solenoid for actuating the valve for delivery of compressed air to the upper end of the cylinder 120 for actuating the material for measuring and feeding apparatus. In effecting a dual actuation of the material measuring apparatus, the timing relay TR1 is deenergized while timing relay TR2 is energized. The timing relay TR2 is provided with two individually adjustable time delay contact mechanisms CTR2A and CTR2B. At the expiration of the time interval provided by CTR2A, it is opened thus deenergizing the solenoid S3 which directs compressed air to the upper end of the cylinder 120 and moves the piston 118 downwardly which, through the rack 114 and the pinion 115, retracts the material measuring and feeding mechanisms to their initial position. When the time interval of CTR2B has elapsed (this timing device being set for a proportionately longer time interval) CTR2B will close, energizing the timer TR1. Energization of the timer TR1 closes CTR1A thus again energizing the solenoid S3 controlling the air valve to again direct pressure fluid below the piston 118 in the cylinder 120 to effect a second material measuring and feeding movement of the bar 80 and associated elements, bringing the tubes 144 into position above the molds 25 a second time for delivering the second charge of material into the mold.

After the expiration of the time interval of the time relay TR1 has elapsed, CTR1B is opened which circuit interruption deenergizes the solenoid S3 controlling the pressure air to the cylinder 150 and retracts the material delivery tubes 144 to an out-of-use position indicated in dotted lines in Figure 6. Simultaneously CTR1C is closed energizing relay R3 which completes an effective circuit through the solenoid S1–S11 controlling the flow of pressure fluid to the cylinder 35 above the piston 39 to initiate downward movement of the piston 39, platen 18 and the male die 21 to complete a molding operation. The succeeding operation of the controlling devices for completing the retraction of the piston 39, the article ejecting means and the air blasts for cleaning the dies operate in the same manner as hereinbefore explained in connection with operation of the apparatus where a single metered charge of material is delivered into the mold at each complete molding operation.

If the repeat switch SN3 is left open, there is no circuit to energize R2 and the operations of the mechanism will cease when the piston 39 reaches its uppermost position. With switch SN3 in closed position, at the expiration of the time period of TM1, relay R4 will be energized, and the normally closed contact CR4 will energize R3. Thus the normally closed contact CR3 of R3 is again closed. Simultaneously the other contact CTM1–TC of TM1 closes, and a circuit is thus completed to energize R2 is itself holding by CR2 through CR1 in preparation for the next cycle as soon as the piston 39 reaches its uppermost position and LS1A is again closed to actuate the feeder, a repetition of the cycle of operations takes place.

It should be noted that the circuits include switch means for individually operating various component units or mechanisms of the apparatus. For example, the material measuring and feeding mechanism may be operated and held in feed position by depressing switch PB6. The piston 39 and platen 18 may be "inched" up or down by operating switch PB9 and closing switch PB7 respectively. Similarly, the article ejector piston 27 and the article removing air blasts may be operated independently of the other units by manipulation of the switch PB8.

The various control mechanisms, relays, timers and the like hereinbefore described for carrying out the various operations of the apparatus may be contained in a control box (not shown) positioned adjacent the apparatus and the compressed air for operating the pistons and air blasts may be secured from a compressor or pressure tank.

The fluid bypass provided by passages 189 and 190 metered or controlled by the adjustable metering or flow control needle valve 193 serves to cushion the upward movement of the piston 39 and eliminates shock in bringing the piston to a position of rest at its uppermost position.

It is apparent that, within the scope of the invention, modifications and different arrangements may be made other than is herein disclosed, and the present disclosure is illustrative merely, the invention comprehending all variations thereof.

What we claim is:

1. In combination with a molding apparatus having a relatively stationary die; a relatively movable die; a hydraulic actuator for reciprocating the movable die to perform molding operations; a material measuring and transferring device for feeding moldable material into the stationary die; means for supplying comminuted moldable material to said device; fluid operated means for actuating said material measuring and transferring device; electrically energized means for controlling the flow of pressure fluid to said fluid operated means; means including a time-controlled relay associated with said electrically energizable means for predetermining the number of material measuring and transferring movements occurring during each molding operation, and electrically operated means for controlling the flow of fluid to said hydraulic actuator to move the relatively movable die to molding position and retract the same.

2. In combination with a molding apparatus having a relatively stationary die; a relatively movable die; a hydraulic actuator for reciprocating the movable die to perform molding operations; a material measuring and transferring device for feeding moldable material into the stationary die; means for supplying moldable material to said device; fluid operated means for actuating said material measuring and transferring device; electrically energized means for controlling the flow of pressure fluid to said fluid operated means; means including a time-controlled relay associated with said electrically energizable means for predetermining the number of material measuring and transferring movements occurring during each molding operation; electrically operated means for controlling the flow of fluid to said hydraulic actuator to move the relatively movable die to molding position and retract the same, and control means intercalated with said electrically operated means for momentarily retracting the movable die from molding position to provide for the escape of gas evolved from the molding material.

3. A molding press including in combination, a frame; a relatively stationary molding die carried by the frame; a movable platen reciprocably supported upon the frame; a mating die carried by said platen; a hydraulic actuator for reciprocating said platen including a cylinder; a piston reciprocably disposed in the cylinder; a piston rod of substantial diameter connecting the platen with the piston; the space between the piston rod and the wall of the cylinder being of comparatively low volumetric capacity to facilitate rapid movement of the platen from its lowermost position to its elevated position; means connected with the respective ends of the cylinder for conveying pressure fluid into and away from said cylinder; adjustable fluid metering means associated with the upper end of the cylinder for retarding the movement of the piston as it approaches its initial elevated position; a bypass in the lower end of the cylinder; a resiliently biased check valve in said bypass; electrically energized means for controlling the flow of pressure fluid into and away from said cylinder for reciprocating the piston between its extreme positions, and supplemental control means including a time delay relay intercalated with said fluid flow control means for momentarily injecting pressure fluid into the cylinder and past the check valve for elevating the piston through a limited distance and returning the piston to its lowermost position.

4. Apparatus for molding resinous material into predetermined configurations including, in combination, a frame adapted to support a molding die; a movable ram adapted to carry a mating die for cooperation with said first-mentioned die; means including a receptacle adapted to contain a supply of powdered resinous material; a material measuring and transferring means associated with said receptacle; electrically-controlled, fluid actuated means for operating said material measuring and transferring means; a material delivery tube articulately supported upon the frame, said tube adapted to receive a measured charge of powdered material from the material measuring and transferring means into the die supported upon the frame; electrically-controlled, fluid-actuated means for moving said material delivery tube into and away from material delivering position; means including a hydraulic actuator for reciprocating the ram, said actuator including a piston reciprocable in a cylinder; electrically-controlled valve means for admitting fluid into said cylinder for reciprocating the piston in the cylinder, and means including a time delay relay intercalated with the control means for the material measuring and transferring means for predetermining the number of measured charges delivered to the molding die for each cycle of reciprocation of the movable die.

References Cited in the file of this patent

UNITED STATES PATENTS

| | | |
|---|---|---|
| 933,528 | Bruce | Sept. 7, 1909 |
| 1,845,232 | Brandenberg | Feb. 16, 1932 |
| 1,877,102 | Whitesell | Sept. 13, 1932 |
| 2,222,732 | Winegar | Nov. 26, 1940 |
| 2,246,461 | Cannon | June 17, 1941 |
| 2,256,081 | Farley | Sept. 16, 1941 |
| 2,282,110 | Angell | May 5, 1942 |
| 2,297,596 | Westin | Sept. 29, 1942 |
| 2,317,823 | Strauss | Apr. 27, 1943 |
| 2,332,937 | Schmidberger | Oct. 26, 1943 |
| 2,348,197 | Ernst et al. | May 9, 1944 |
| 2,380,084 | Strauss | July 10, 1945 |
| 2,409,725 | Whitemore et al. | Oct. 22, 1946 |
| 2,444,339 | Dinzl | June 29, 1948 |
| 2,448,277 | Reiner | Aug. 31, 1948 |
| 2,454,362 | Whitemore et al. | Nov. 23, 1948 |
| 2,592,768 | Van Der Pyl | Apr. 15, 1952 |
| 2,627,086 | Hallenbeck | Feb. 3, 1953 |